(12) United States Patent
Zhang

(10) Patent No.: US 11,822,498 B2
(45) Date of Patent: Nov. 21, 2023

(54) CONNECTOR, NVME STORAGE DEVICE, AND COMPUTER DEVICE

(71) Applicant: XFUSION DIGITAL TECHNOLOGIES CO., LTD., Zhengzhou (CN)

(72) Inventor: Xian Zhang, Hangzhou (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 411 days.

(21) Appl. No.: 16/839,476

(22) Filed: Apr. 3, 2020

(65) Prior Publication Data

US 2020/0233823 A1  Jul. 23, 2020

Related U.S. Application Data

(63) Continuation of application No. PCT/CN2018/075438, filed on Feb. 6, 2018.

(30) Foreign Application Priority Data

Oct. 13, 2017  (CN) .......................... 201721329936.4

(51) Int. Cl.
*G06F 13/14* (2006.01)
*G06F 13/40* (2006.01)
(Continued)

(52) U.S. Cl.
CPC ............ *G06F 13/40* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS 9,703,745 B2    7/2017  He et al.
2009/0068896 A1  3/2009  Zhang
(Continued)

FOREIGN PATENT DOCUMENTS

CN    1731362 A    2/2006
CN  101201888 A    6/2008
(Continued)

OTHER PUBLICATIONS

Enterprise SSD Form Factor Version 1.0, 2011, pp. 1-56 (Year: 2011).*

(Continued)

*Primary Examiner* — Henry Tsai
*Assistant Examiner* — Dean Phan
(74) *Attorney, Agent, or Firm* — WOMBLE BOND DICKINSON (US) LLP

(57) ABSTRACT

A connector includes a first pin which is configured to indicate an in-service signal, a second pin which is configured to indicate a power supply signal, a third pin which is configured to indicate a clock signal, and a fourth pin; the first pin which is configured to indicate a PCIe port signal; the first pin, the second pin, the third pin, and the fourth pin have an equal length; and the connector includes a first face and a second face, a limiting structure is arranged on the first face, the limiting structure is a boss or a groove, and the first pin is located in the middle of the first face.

17 Claims, 10 Drawing Sheets

Pin P4

(51) Int. Cl.
  *G06F 3/06* (2006.01)
  *H01R 12/71* (2011.01)
  *H01R 13/02* (2006.01)
(52) U.S. Cl.
  CPC ........... *H01R 12/716* (2013.01); *H01R 13/02* (2013.01); *G06F 2213/0026* (2013.01); *H01R 2201/06* (2013.01)

(56) References Cited

U.S. PATENT DOCUMENTS

| | | | |
|---|---|---|---|
| 2012/0238145 A1 | 9/2012 | Zhang et al. | |
| 2016/0179182 A1* | 6/2016 | Horie | G06F 1/263 713/323 |
| 2017/0220505 A1* | 8/2017 | Breakstone | G06F 13/4282 |
| 2018/0260349 A1* | 9/2018 | Mondal | G06F 13/366 |

FOREIGN PATENT DOCUMENTS

| | | |
|---|---|---|
| CN | 201285931 Y | 8/2009 |
| CN | 102694318 A | 9/2012 |
| CN | 104035341 A | 9/2014 |
| CN | 105095037 A | 11/2015 |
| CN | 105893298 A | 8/2016 |
| CN | 106407146 A | 2/2017 |
| CN | 206236840 U | 6/2017 |
| CN | 107145430 A | 9/2017 |
| CN | 107220196 A | 9/2017 |
| CN | 104951384 B | 10/2017 |
| CN | 207529373 U | 6/2018 |
| EP | 2096527 A1 | 9/2009 |
| WO | WO-2016085493 A1 * | 6/2016 ............. G06F 1/183 |

OTHER PUBLICATIONS

"SFF-8639 Rev 2.1 Specification for Multifunction 6X Unshielded Connector," XP055725609, SFF Committee, Published on May 26, 2017, 26 pages.
"Enterprise SSD Form Factor 1.0,SSD Form Factor Work Group," XP055725673, published on Dec. 20, 2011, 56 pages.
"Enterprise SSD Form Factor," Version 1.0a, Dec. 12, 2012, 55 pages.
"PCI Express, SFF-8639 Module Specification, Revision 0.5," Sep. 3, 2013, 87 pages.
SFF-8639 "Specification for Multifunction 12 GB/s 6X Unshielded Connector," Rev 1.6, Nov. 28, 2012, 29 pages.

* cited by examiner

CONNECTOR, NVME STORAGE DEVICE, AND COMPUTER DEVICE

CROSS-REFERENCE TO RELATED APPLICATIONS

This is a continuation of Int'l Patent App. No. PCT/CN2018/075438 filed on Feb. 6, 2018, which claims priority to Chinese Patent App. No. 201721329936.4 filed on Oct. 13, 2017, which are incorporated by reference.

TECHNICAL FIELD

Embodiments of this application relate to the field of storage technologies, and in particular, to a connector, an NVM Express (NVMe) storage device, and a computer device.

BACKGROUND

Peripheral Component Interface Express (PCIe) is a latest bus and interface standard, belongs to high-speed serial point-to-point dual-channel high-bandwidth transmission, and represents a next-generation input/output (I/O) interface standard. A PCIe solid-state storage device (such as a solid-state disk (SSD)) is a solid-state storage device connected to a PCIe interface of a central processing unit (CPU). The NVMe standard is a storage controller interface standard developed for enterprises and common client systems that use PCIe solid-state storage devices ("PCIe devices"). A PCIe device based on the NVMe standard may be referred to as an NVMe storage device (or an NVMe SSD). The NVMe storage device is characterized by low energy consumption and high performance.

For most computer devices (such as disk arrays or servers) that support the NVMe storage device, they need to support forcible hot swapping. The computer device may be referred to as a host. The forcible hot swapping is live hot swapping, a user is allowed to directly insert an NVMe storage device into a host or remove an NVMe storage device from a host without shutting down a system or switching off a power supply, and normal running of the host is not affected. When no NVMe storage device is present in a slot of the host, a PCIe port corresponding to the slot is disabled by default. After an NVMe storage device is inserted, the system reports a disk insertion interrupt based on a change in an in-service signal. A PCIe hot swapping controller in the system enables a power supply, a clock, and a PCIe port for the slot successively, to start a hot-add process. Therefore, the in-service signal is a key signal that triggers a process of forcible hot swapping of the NVMe storage device.

The NVMe storage device uses an SFF-8639 connector, and a signal of a pin P4 of the connector is used as an in-service signal of the NVMe storage device. The signal of the pin P4 of the SFF-8639 connector is referred to as an Interface Type Detect (IfDet) signal denoted as "IFDET#". If IFDET# is 0, it indicates that the NVMe storage device is in service. If IFDET# is 1, it indicates that the NVMe storage device is not in service. In SFF-8639 Specification for Multifunction 12 Gb/s 6X Unshielded Connector, PCI Express ® SFF-8639 Module Specification, and Copyright © 2012 SSD Form Factor Work Group, All rights reserved, a contact sequence of the pin P4 of the SFF-8639 connector is defined as 1st. In other words, both a pin P4 of a male connector of the SFF-8639 connector and a pin P4 of a female connector of the SFF-8639 connector are long pins. When the male connector of the SFF-8639 connector is inserted into the female connector, the pins P4 are the first to come into contact. When the male connector of the SFF-8639 connector is removed from the female connector, the pins P4 are the last to be disconnected.

Currently, when the NVMe storage device is removed and inserted, the following problem arises: The NVMe storage device cannot successfully access the system, and reliability is low

SUMMARY

Embodiments of this application provide a connector, an NVMe storage device, and a computer device, so as to resolve the following problem that lies in other approaches: When an NVMe storage device is removed and inserted, the NVMe storage device cannot successfully access a system.

According to one aspect, an embodiment of this application provides a connector. The connector is configured to provide a PCIe communications interface. The PCIe communications interface is configured to connect an NVMe storage device and a computer device. The connector includes at least a first pin, a second pin, a third pin, and a fourth pin. The first pin is configured to indicate an in-service signal of the NVMe storage device; the second pin is configured to indicate a power supply signal of the NVMe storage device; the third pin is configured to indicate a clock signal of the NVMe storage device; the fourth pin is configured to indicate a PCIe port signal of the NVMe storage device; and the first pin, the second pin, the third pin, and the fourth pin have an equal length. The connector includes a first face and a second face, a limiting structure is arranged on the first face, the limiting structure is a boss or a groove, and the first pin is located in the middle of the first face.

In the solutions provided in this embodiment of this application, lengths of the pins of the connector are changed, so that the pins of the connector respectively configured to indicate the in-service signal, the power supply signal, the clock signal, and the PCIe port signal have an equal length. In this way, the in-service signal can more accurately reflect a state of the NVMe storage device when the NVMe storage device is inserted or removed, thereby avoiding the following problem: The NVMe storage device cannot successfully access a system when the NVMe storage device is removed and inserted.

In a possible design, the first pin is a short pin.

In a possible design, the limiting structure is the boss, the connector is a male connector, and a length of the first pin is 4.55 ± 0.08 millimeters (mm).

In a possible design, the limiting structure is the groove, the connector is a female connector, and a distance between the first pin and a side edge of a slot of the female connector is 1.90 ± 0.15 mm.

In a possible design, a distance between the first pin and a first edge pin at one end of the first face is 17.87 mm, and a distance between the first pin and a second edge pin at the other end of the first face is 13.97 mm.

According to another aspect, an embodiment of this application provides a connector. The connector is configured to provide a PCIe communications interface. The PCIe communications interface is configured to connect an NVMe storage device and a computer device. The connector includes at least a first pin, a second pin, a third pin, and a fourth pin. The first pin is configured to indicate an in-service signal of the NVMe storage device; the second pin is configured to indicate a power supply signal of the NVMe storage device; the third pin is configured to indicate a clock signal of the NVMe storage device; the fourth pin is configured to indicate a PCIe port signal of the NVMe storage device; and a length of the first pin is not greater than a length of a shortest pin among the second pin, the third pin, and the fourth pin. The connector includes a first face and a second face, a limiting structure is arranged on the first face, the limiting structure is a boss or a groove, and the first pin is located in the middle of the first face.

In the solutions provided in this embodiment of this application, lengths of the pins of the connector are changed, so that a length of the pin of the connector configured to indicate the in-service signal is not greater than lengths of the pins respectively configured to indicate the power supply signal, the clock signal, and the PCIe port signal. In this way, the in-service signal can more accurately reflect a state of the NVMe storage device when the NVMe storage device is inserted or removed, thereby avoiding the following problem: The NVMe storage device cannot successfully access a system when the NVMe storage device is removed and inserted.

In a possible design, the first pin is a short pin.

In a possible design, the limiting structure is the boss, the connector is a male connector, and the length of the first pin is 4.55 ± 0.08 mm.

In a possible design, the limiting structure is the groove, the connector is a female connector, and a distance between the first pin and a side edge of a slot of the female connector is 1.90 ± 0.15 mm.

In a possible design, a distance between the first pin and a first edge pin at one end of the first face is 17.87 mm, and a distance between the first pin and a second edge pin at the other end of the first face is 13.97 mm.

According to still another aspect, an embodiment of this application provides an NVMe storage device. The NVMe storage device includes a controller, a memory, and the connector according to any one of the foregoing aspects. The controller is electrically connected to the memory and the connector.

In a possible design, the memory is a flash memory or a dynamic random-access memory (DRAM).

According to yet another aspect, an embodiment of this application provides a computer device. The computer device includes a processing module and the connector according to any one of the foregoing aspects. The processing module is electrically connected to the connector.

In a possible design, the processing module includes a central processing unit, and the CPU is electrically connected to the connector.

In a possible design, the processing module includes a CPU and a PCIe switching chip; the PCIe switching chip includes an input port and N output ports, where N is a positive integer; the CPU is electrically connected to the input port; and each of the N output ports is configured to electrically connect to one connector.

According to still yet another aspect, an embodiment of this application provides a storage system. The storage system includes the NVMe storage device and the computer device according to any one of the foregoing aspects.

Comparing with other approaches, in the solutions provided in the embodiments of this application, the lengths of the pins of the connector are changed, so that the pins of the connector respectively configured to indicate the in-service signal, the power supply signal, the clock signal, and the PCIe port signal have an equal length, or the length of the pin configured to indicate the in-service signal is not greater than the lengths of the pins respectively configured to indicate the power supply signal, the clock signal, and the PCIe port signal. In this way, the in-service signal can more accurately reflect the inserted or removed state of the NVMe storage device, thereby avoiding the following problem: The NVMe storage device cannot successfully access the system when the NVMe storage device is removed and inserted.

DESCRIPTION OF EMBODIMENTS

To make the objectives, technical solutions, and advantages of this application clearer, the following further describes the implementations of this application in detail with reference to the accompanying drawings.

In some approaches, an NVMe storage device uses an SFF-8639 connector as its hard disk connector. The SFF-8639 connector includes a male connector and a female connector. Usually, the male connector of the SFF-8639 connector is assembled on the NVMe storage device, and the female connector of the SFF-8639 connector is assembled on a host. A process of inserting the NVMe storage device into a slot of the host is a process of inserting the male connector into the female connector.

Figure 1:
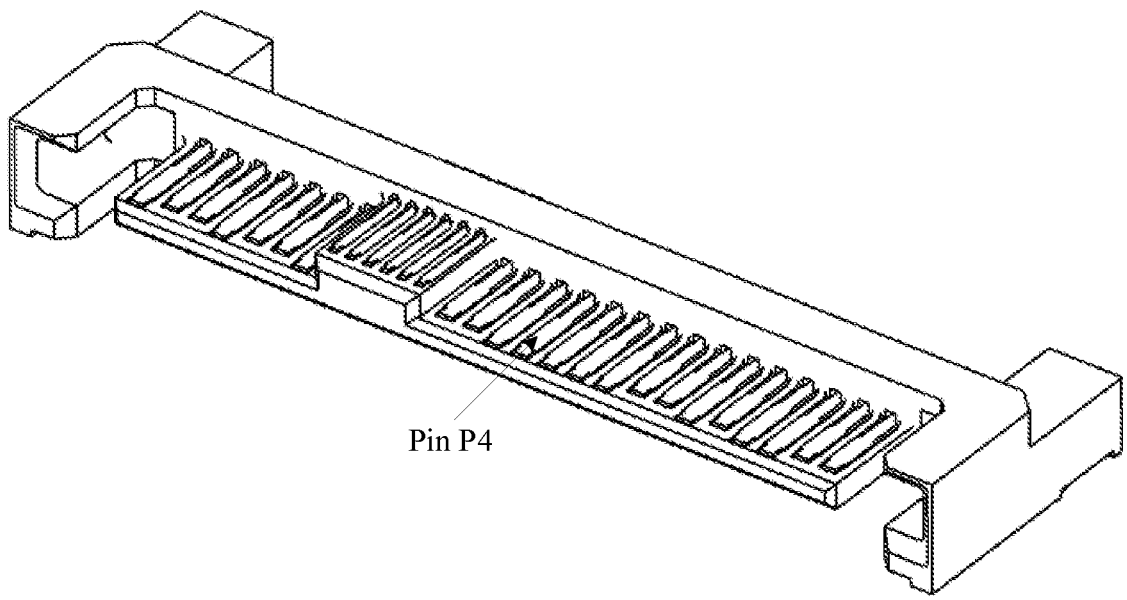
FIG. 1 is a schematic diagram of a male connector of an SFF-8639 connector.

FIG. 1 is a schematic diagram of a male connector of an SFF-8639 connector. As can be learned from the figure, pins of the male connector include long pins and short pins, and the long pin is longer than the short pin. In the male connector, a pin configured to indicate an in-service signal is a pin P4. As can be learned from the figure, the pin P4 of the male connector is a long pin.

Figure 2:
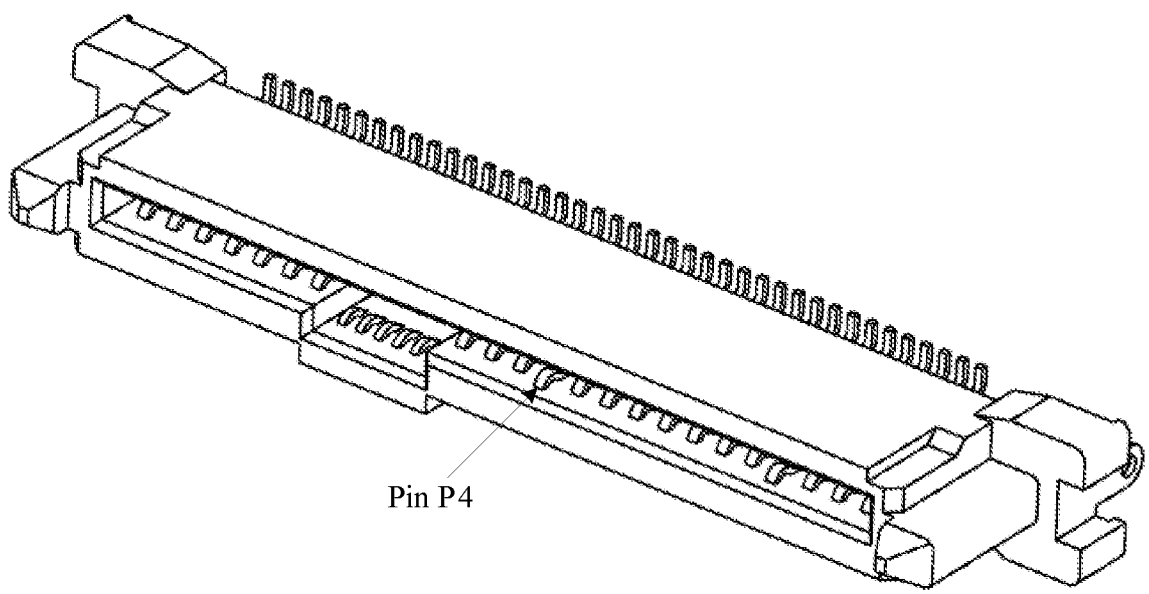
FIG. 2 is a schematic diagram of a female connector of an SFF-8639 connector.

FIG. 2 is a schematic diagram of a female connector of an SFF-8639 connector. As can be learned from the figure, pins of the female connector include long pins and short pins, and the long pin is longer than the short pin. In the female connector, a pin configured to indicate an in-service signal is a pin P4. As can be learned from the figure, the pin P4 of the female connector is also a long pin.

When the NVMe storage device is removed and inserted, the following problem arises: The NVMe storage device cannot successfully access a system. The problem is described below in the following two scenarios.

1. Scenario in which the NVMe storage device is slowly inserted

Because both the pin P4 of the male connector and the pin P4 of the female connector of the SFF-8639 connector are long pins, a contact sequence of the pins P4 is 1st. In a process of inserting the NVMe storage device into a slot of the host, the pins P4 are the first to come into contact and the in-service signal IFDET# changes from 1 to 0, indicating that the NVMe storage device is in service.

When detecting that the in-service signal IFDET# changes from 1 to 0, the system reports a disk insertion interrupt. A PCIe hot swapping controller in the system enables a power supply, a clock, and a PCIe port for the slot successively, to start a hot-add process. However, pins for the power supply, the clock, and the PCIe port are short pins. Therefore, when the NVMe storage device is slowly inserted, the pins for the power supply, the clock, and the PCIe port are not yet in contact with corresponding pins, causing a failure to execute the hot-add process. When the hot-add process fails to be executed, the PCIe hot swapping controller in the system determines that the NVMe storage device is a faulty disk and disables the PCIe port.

When the NVMe storage device continues to be inserted subsequently, although the pins for the power supply, the clock, and the PCIe port are successfully in contact with corresponding pins, the in-service signal does not change at this moment. Therefore, the system does not report the disk insertion interrupt again to trigger the hot-add process, and the NVMe storage device ultimately fails to access the system.

The foregoing scenario of slowly inserting the NVMe storage device includes but is not limited to the following cases:

(1) The NVMe storage device is inserted at a low speed, so that a contact time of a pin whose contact sequence is 3rd is much later than a contact time of a pin whose contact sequence is 1st.

(2) In a process of inserting the NVMe storage device, a pin whose contact sequence is 1st comes into contact first, but an insertion operation stops at this moment and consequently a pin whose contact sequence is 3rd is not in contact with corresponding pin for a long period.

(3) In a process of inserting the NVMe storage device, a pin whose contact sequence is 1st comes into contact first, but a pin whose contact sequence is 3rd is not in contact with corresponding pin. At this moment, a user locks a buckle of a front panel so that the NVMe storage device is completely inserted. In this case, possibly, a contact time of the pin whose contact sequence is 3 rd is much later than a contact time of the pin whose contact sequence is 1st.

2. Scenario in which the NVMe storage device is slowly removed but inserted back again before NVMe storage device is completely removed In a process of removing the NVMe storage device from a slot of the host, because the pins of the power supply, the clock, and the PCIe port are short pins, the pins for the power supply, the clock, and the PCIe port are first disconnected. In this case, a PCIe link is disconnected, and downstream port containment (DPC) is triggered to isolate the NVMe storage device and disable the PCIe port. However, the pin P4 is still in contact with corresponding pin because the pin P4 is a long pin. If the NVMe storage device continues to be removed, no impact is caused on the system. If the removal stops and the NVMe storage device is inserted back again at this moment, because the in-service signal does not change in this case, the system does not report a disk insertion interrupt to trigger a hot-add process and the NVMe storage device cannot successfully access the system.

In some approaches, for a connector of an NVMe storage device, a pin configured to indicate an in-service signal is a long pin, whereas pins respectively configured to indicate a power supply signal, a clock signal, and a PCIe port signal are short pins. Therefore, the in-service signal cannot accurately reflect a state of the NVMe storage device when the NVMe storage device is inserted or removed. In the embodiments of this application, lengths of pins of a connector are changed, so that pins of the connector respectively configured to indicate an in-service signal, a power supply signal, a clock signal, and a PCIe port signal have an equal length, or a length of a pin configured to indicate an in-service signal is not greater than lengths of pins respectively configured to indicate a power supply signal, a clock signal, and a PCIe port signal. In this way, the in-service signal can more accurately reflect an inserted or removed state of an NVMe storage device, thereby avoiding the following problem: The NVMe storage device cannot successfully access the system when the NVMe storage device is removed and inserted.

The following further describes the embodiments of this application in detail with reference to common aspects in the embodiments of this application.

Figure 3:
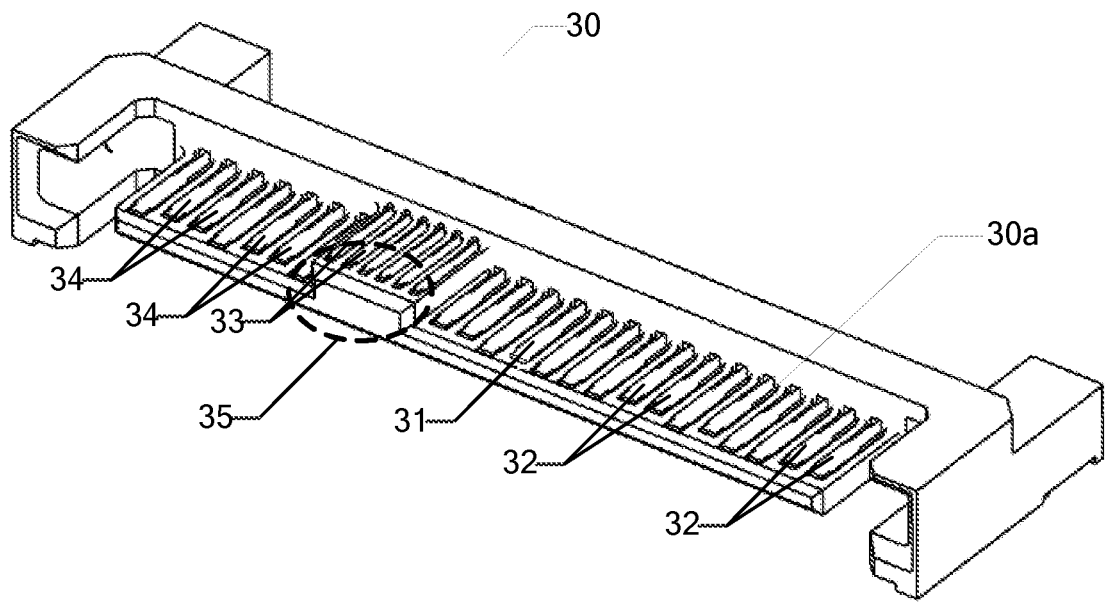
FIG. 3 is a schematic diagram of a connector according to an embodiment of this application.

Referring to FIG. 3, FIG. 3 is a schematic diagram of a connector according to an embodiment of this application. The connector is configured to provide a PCIe communications interface for connecting an NVMe storage device and a computer device. Optionally, the connector is an SFF-8639 connector defined in related standards, such as SFF-8639 Specification for Multifunction 12 Gb/s 6X Unshielded Connector, PCI Express ® SFF-8639 Module Specification, and Copyright © 2012 SSD Form Factor Work Group, All rights reserved. In this embodiment, that the connector is a male connector 30 is used as an example. As shown in FIG. 3, the male connector 30 includes a first pin 31, a second pin 32, a third pin 33, and a fourth pin 34.

The first pin 31 is configured to indicate an in-service signal of the NVMe storage device. The second pin 32 is configured to indicate a power supply signal of the NVMe storage device. The third pin 33 is configured to indicate a clock signal of the NVMe storage device. The fourth pin 34 is configured to indicate a PCIe port signal of the NVMe storage device.

Optionally, when the male connector 30 is a male connector of the SFF-8639 connector, the male connector 30 includes pins P1 to P15, pins S1 to S28, and pins E1 to E25, totaling 68 pins. The pin (that is, the first pin 31) configured to indicate the in-service signal of the NVMe storage device is a pin P4. The pin (that is, the second pin 32) configured to indicate the power supply signal of the NVMe storage device includes pins such as P8, P9, P14, P15, and E3. The pin (that is, the third pin 33) configured to indicate the clock signal of the NVMe storage device includes pins such as E1, E2, E7, and E8. The pin (that is, the fourth pin 34) configured to indicate the PCIe port signal of the NVMe storage device includes pins such as S2, S3, S5, S6, S9, S10, S12, S13, S17, S18, S20, S21, S23, S24, S24, S27, E10, E11, E13, E14, E17, E18, E20, and E21. In addition, the male connector 30 further includes pins having other functions, such as a pin configured to indicate a reset signal and a pin configured to indicate a grounding signal.

Unlike other approaches, in a possible implementation solution provided in this embodiment of this application, the first pin 31, the second pin 32, the third pin 33, and the fourth pin 34 of the male connector 30 have an equal length. In this embodiment of this application, lengths of the pins of the male connector 30 are changed, so that for the male connector 30, the pins respectively configured to indicate the in-service signal, the power supply signal, the clock signal, and the PCIe port signal have an equal length. In this way, the in-service signal can more accurately reflect a state of the NVMe storage device when the NVMe storage device is inserted or removed, thereby avoiding the following problem: The NVMe storage device cannot successfully access the system when the NVMe storage device is removed and inserted.

In an example, the first pin 31, the second pin 32, the third pin 33, and the fourth pin 34 all are short pins (as shown in FIG. 3). The SFF-8639 connector is used as an example. In some approaches, for the male connector of the SFF-8639 connector, the pins respectively configured to indicate the power supply signal, the clock signal, and the PCIe port signal all are short pins, whereas the pin (that is, the pin P4) configured to indicate the in-service signal is a long pin. Therefore, only the pin P4 needs to be changed from a long pin to a short pin to ensure that the pins respectively configured to indicate the in-service signal, the power supply signal, the clock signal, and the PCIe port signal have an equal length, so that lengths of a relatively small quantity of pins need to be changed.

In another example, the first pin 31, the second pin 32, the third pin 33, and the fourth pin 34 all are long pins (which are not shown in the figure). The SFF-8639 connector is used as an example. In some approaches, for the male connector of the SFF-8639 connector, the pins respectively configured to indicate the power supply signal, the clock signal, and the PCIe port signal all are short pins, whereas the pin (that is, the pin P4) configured to indicate the in-service signal is a long pin. Therefore, changing the pins respectively configured to indicate the power supply signal, the clock signal, and the PCIe port signal from short pins to long pins can also ensure that the pins respectively configured to indicate the in-service signal, the power supply signal, the clock signal, and the PCIe port signal have an equal length.

It needs to be noted that in this embodiment of this application, any two pins having an equal length may mean that values of lengths of the two pins are identical or a difference between lengths of the two pins is smaller than a preset threshold. The preset threshold may be a preset empirical value, as long as the empirical value ensures that contact sequences of the two pins belong to a same level. For example, when two pins are both short pins and a difference between lengths of the two pins is smaller than 0.08 mm, contact sequences of the two pins are both 1st.

In another possible implementation solution provided in this embodiment of this application, a length of the first pin 31 of the male connector 30 is not greater than a length of the shortest pin among the second pin 32, the third pin 33, and the fourth pin 34. For example, the length of the first pin 31 is the same as or even smaller than the length of the shortest pin.

Optionally, the second pin 32, the third pin 33, and the fourth pin 34 all are short pins, the first pin 31 is also a short pin, and a value range of a length of a short pin of the male connector 30 is 4.55 ± 0.08 mm. Assuming that the length of the shortest pin among the second pin 32, the third pin 33, and the fourth pin 34 is 4.55 mm, the length of the first pin 31 is less than or equal to 4.55 mm.

The lengths of the pins of the male connector 30 are changed, so that for the male connector 30, the length of the pin configured to indicate the in-service signal is not greater than the lengths of the pins respectively configured to indicate the power supply signal, the clock signal, and the PCIe port signal. In this way, it can also be ensured that the in-service signal can accurately reflect the inserted or removed state of the NVMe storage device, thereby avoiding the following problem: The NVMe storage device cannot successfully access the system when the NVMe storage device is removed and inserted.

Figure 4:
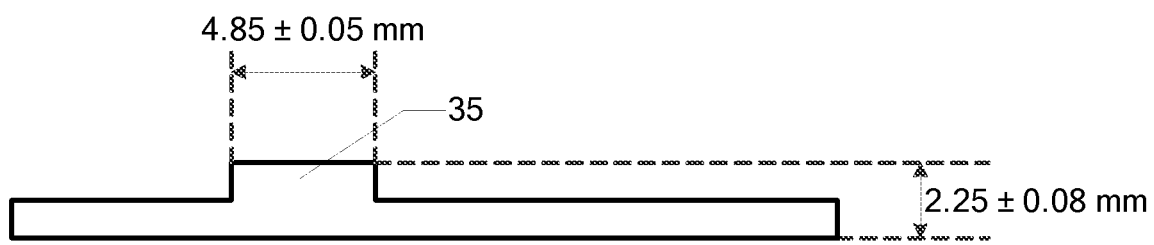
FIG. 4 is a simplified side view of a male connector from a plug side.

In addition, the male connector 30 includes a first face and a second face. The first face and the second face are opposite to each other. FIG. 3 shows the first face 30a of the male connector 30. A limiting structure 35 is arranged on the first face 30a of the male connector 30. The limiting structure 35 is a boss. In FIG. 3, the boss is indicated by a dotted ellipse. Referring to FIG. 4, FIG. 4 is a simplified side view of the male connector 30 from a plug side. A length of the limiting structure 35 (that is, the boss) is 4.85 ± 0.05 mm, and a height of the limiting structure 35 is 2.25 ± 0.08 mm.

As shown in FIG. 3, the first pin 31 is located in the middle of the first face 30a of the male connector 30. The middle means that a distance between the first pin 31 and a pin at one end of the first face 30a of the male connector 30 is the same as or close to a distance between the first pin 31 and a pin at the other end of the first face 30a of the male connector 30, but is not limited to that the distance between the first pin 31 and the pin at one end of the first face 30a of the male connector 30 must be the same as the distance between the first pin 31 and the pin at the other end of the first face 30a of the male connector 30. In other words, the middle is not limited to that the first pin 31 is located in the very middle of the first face 30a of the male connector 30.

Figure 5:
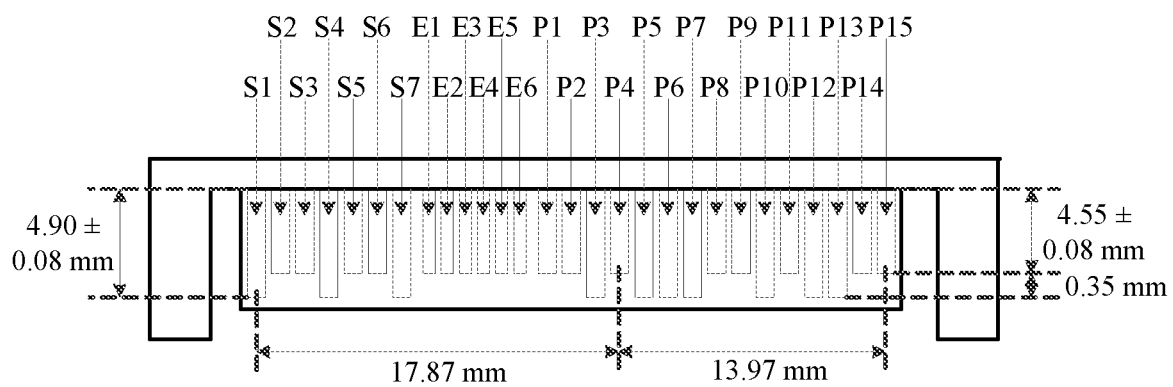
FIG. 5 is a simplified schematic diagram of a first face of a male connector.

Referring to FIG. 5, FIG. 5 is a simplified schematic diagram of the first face 30a of the male connector 30. When the male connector 30 is the male connector of the SFF-8639 connector, pins S1 to S7, E1 to E6, and P1 to P15, which total 28 pins, are arranged on the first face 30a of the male connector 30. The 28 pins are arranged one by one from a first end of the male connector 30 to a second end of the male connector 30 according to a sequence of the pins S1 to S7, E1 to E6, and P1 to P15. The pins E1 to E6 are arranged on the boss, and the pins S1 to S7 are located on a side, close to the first end of the male connector 30, of the boss. The pins P1 to P15 are located on a side, close to the second end of the male connector 30, of the boss. Pins E7 to E16, S8 to S28, and E17 to E25, which total 40 pins, are arranged on the second face of the male connector 30. The 40 pins are arranged one by one from the first end of the male connector 30 to the second end of the male connector 30 according to a sequence of the pins E7 to E16, S8 to S28, and E17 to E25. Of the foregoing pins, the pin P4 is configured to indicate the in-service signal of the NVMe storage device. To be specific, the first pin 31 is the pin P4. The first pin 31 (that is, the pin P4) is arranged on the first face 30a of the male connector 30, and is the seventeenth pin counted from the first end of the male connector 30.

Optionally, the distance between the first pin 31 and the pin at one end of the first face 30a of the male connector 30 is 17.87 mm, and the distance between the first pin 31 and the pin at the other end of the first face 30a of the male connector 30 is 13.97 mm. To be specific, as shown in FIG. 5, a distance between the first pin 31 (that is, the pin P4) and a first edge pin (that is, the pin S1) at one end of the first face 30a of the male connector 30 is 17.87 mm, and a distance between the first pin 31 (that is, the pin P4) and a second edge pin (that is, the pin P15) at the other end of the first face 30a of the male connector 30 is 13.97 mm. The distance between two pins is a distance between a central line position of a spring plate of one pin and a central line position of a spring plate of the other pin.

In addition, as shown in FIG. 5, the pins of the male connector 30 include long pins and short pins. A long pin is longer than a short pin, and a difference between a length of a long pin and a length of a short pin is greater than or equal to 0.35 mm. A length of a long pin is 4.90 ± 0.08 mm, and a length of a short pin is 4.55 ± 0.08 mm. To be specific, when the first pin 31 (that is, the pin P4) is a short pin, the length of the first pin 31 (that is, the pin P4) is 4.55 ± 0.08 mm; or when the first pin 31 (that is, the pin P4) is a long pin, the length of the first pin 31 (that is, the pin P4) is 4.90 ± 0.08 mm.

In the solutions provided in this embodiment of this application, lengths of the pins of the male connector 30 are changed, so that for the male connector 30, the pins respectively configured to indicate the in-service signal, the power supply signal, the clock signal, and the PCIe port signal have an equal length, or the length of the pin configured to indicate the in-service signal is not greater than the lengths of the pins respectively configured to indicate the power supply signal, the clock signal, and the PCIe port signal. In this way, the in-service signal can more accurately reflect the inserted or removed state of the NVMe storage device, thereby avoiding the following problem: The NVMe storage device cannot successfully access the system when the NVMe storage device is removed and inserted.

Figure 6:
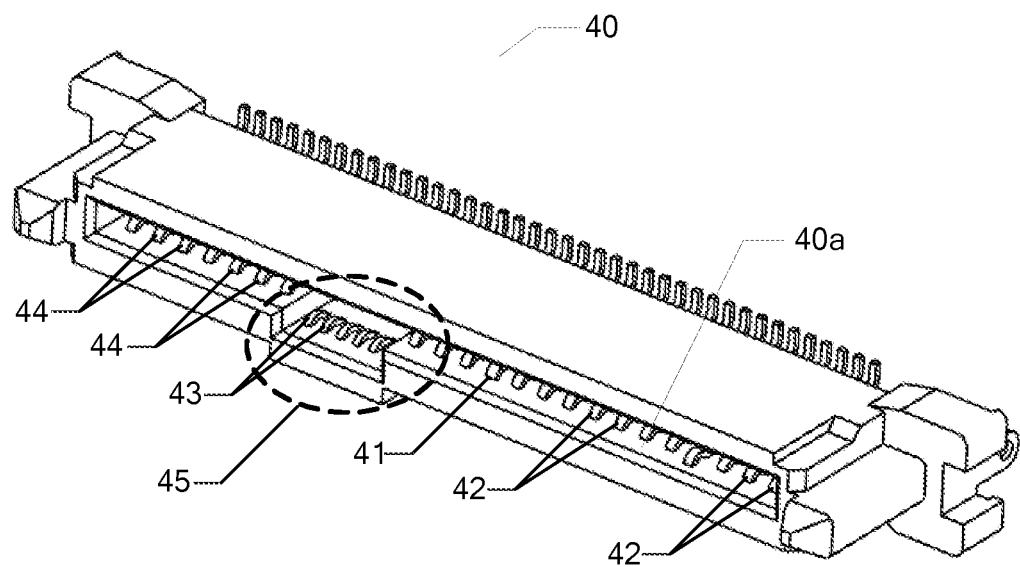
FIG. 6 is a schematic diagram of a connector according to another embodiment of this application.

Referring to FIG. 6, FIG. 6 is a schematic diagram of a connector according to another embodiment of this application. The connector is configured to provide a PCIe communications interface for connecting an NVMe storage device and a computer device. Optionally, the connector is an SFF-8639 connector defined in related standards, such as SFF-8639 Specification for Multifunction 12 Gb/s 6X Unshielded Connector, PCI Express ® SFF-8639 Module Specification, and Copyright © 2012 SSD Form Factor Work Group, All rights reserved. In this embodiment, that the connector is a female connector 40 is used as an example. As shown in FIG. 6, the female connector 40 includes a first pin 41, a second pin 42, a third pin 43, and a fourth pin 44.

The first pin 41 is configured to indicate an in-service signal of the NVMe storage device. The second pin 42 is configured to indicate a power supply signal of the NVMe storage device. The third pin 43 is configured to indicate a clock signal of the NVMe storage device. The fourth pin 44 is configured to indicate a PCIe port signal of the NVMe storage device.

Optionally, when the female connector 40 is a female connector of the SFF-8639 connector, the female connector 40 includes pins P1 to P15, S1 to S28, and E1 to E25, totaling 68 pins. The pin (that is, the first pin 41) configured to indicate the in-service signal of the NVMe storage device is a pin P4. The pin (that is, the second pin 42) configured to indicate the power supply signal of the NVMe storage device includes pins such as P8, P9, P14, P15, and E3. The pin (that is, the third pin 43) configured to indicate the clock signal of the NVMe storage device includes pins such as E1, E2, E7, and E8. The pin (that is, the fourth pin 44) configured to indicate the PCIe port signal of the NVMe storage device includes pins such as S2, S3, S5, S6, S9, S10, S12, S13, S17, S18, S20, S21, S23, S24, S24, S27, E10, E11, E13, E14, E17, E18, E20, and E21. In addition, the female connector 40 further includes pins having other functions, such as a pin configured to indicate a reset signal and a pin configured to indicate a grounding signal.

Unlike other approaches, in a possible implementation solution provided in this embodiment of this application, the first pin 41, the second pin 42, the third pin 43, and the fourth pin 44 of the female connector 40 have an equal length. In this embodiment of this application, lengths of the pins of the female connector 40 are changed, so that for the female connector 40, the pins respectively configured to indicate the in-service signal, the power supply signal, the clock signal, and the PCIe port signal have an equal length. In this way, the in-service signal can more accurately reflect a state of the NVMe storage device when the NVMe storage device is inserted or removed, thereby avoiding the following problem: The NVMe storage device cannot successfully access a system when the NVMe storage device is removed and inserted.

In an example, the first pin 41, the second pin 42, the third pin 43, and the fourth pin 44 all are short pins (as shown in FIG. 6). The SFF-8639 connector is used as an example. In some approaches, for a female connector of an SFF-8639 connector, pins respectively configured to indicate a power supply signal, a clock signal, and a PCIe port signal all are short pins, whereas a pin (that is, a pin P4) configured to indicate an in-service signal is a long pin. Therefore, only the pin P4 needs to be changed from a long pin to a short pin to ensure that the pins respectively configured to indicate the in-service signal, the power supply signal, the clock signal, and the PCIe port signal have an equal length, so that lengths of a relatively small quantity of pins need to be changed.

In another example, the first pin 41, the second pin 42, the third pin 43, and the fourth pin 44 all are long pins (which are not shown in the figure). The SFF-8639 connector is used as an example. In some approaches, for the female connector of the SFF-8639 connector, the pins respectively configured to indicate the power supply signal, the clock signal, and the PCIe port signal all are short pins, whereas the pin (that is, the pin P4) configured to indicate the in-service signal is a long pin. Therefore, changing the pins respectively configured to indicate the power supply signal, the clock signal, and the PCIe port signal from short pins to long pins can also ensure that the pins respectively configured to indicate the in-service signal, the power supply signal, the clock signal, and the PCIe port signal have an equal length.

It needs to be noted that in this embodiment of this application, any two pins having an equal length may mean that values of lengths of the two pins are identical or a difference between lengths of the two pins is smaller than a preset threshold. The preset threshold may be a preset empirical value, as long as the empirical value ensures that contact sequences of the two pins belong to a same level. For example, when two pins are both short pins and a difference between lengths of the two pins is smaller than 0.08 mm, contact sequences of the two pins are both 3rd.

In another possible implementation solution provided in this embodiment of this application, a length of the first pin 41 of the female connector 40 is not greater than a length of the shortest pin among the second pin 42, the third pin 43, and the fourth pin 44. For example, the length of the first pin 41 is the same as or even smaller than the length of the shortest pin.

Optionally, the second pin 42, the third pin 43, and the fourth pin 44 all are short pins, the first pin 41 is also a short pin, and for the female connector 40, a pin with a smaller distance to a side edge of a slot has a longer length. A value range of a distance between a long pin of the female connector 40 and the side edge of the slot of the female connector 40 is 1.40 ± 0.15 mm, and a value range of a distance between a short pin of the female connector 40 and the side edge of the slot of the female connector 40 is 1.90 ± 0.15 mm. Assuming that a distance between the side edge and the shortest pin among the second pin 42, the third pin 43, and the fourth pin 44 is 2.00 mm, a distance between the first pin 41 and the side edge of the slot side is greater than or equal to 2.00 mm.

Lengths of the pins of the female connector 40 are changed, so that for the female connector 40, the length of the pin configured to indicate the in-service signal is not greater than lengths of the pins respectively configured to indicate the power supply signal, the clock signal, and the PCIe port signal. In this way, it can also be ensured that the in-service signal can accurately reflect a state of the NVMe storage device when the NVMe storage device is inserted or removed, thereby avoiding the following problem: The NVMe storage device cannot successfully access a system when the NVMe storage device is removed and inserted.

Figure 7:
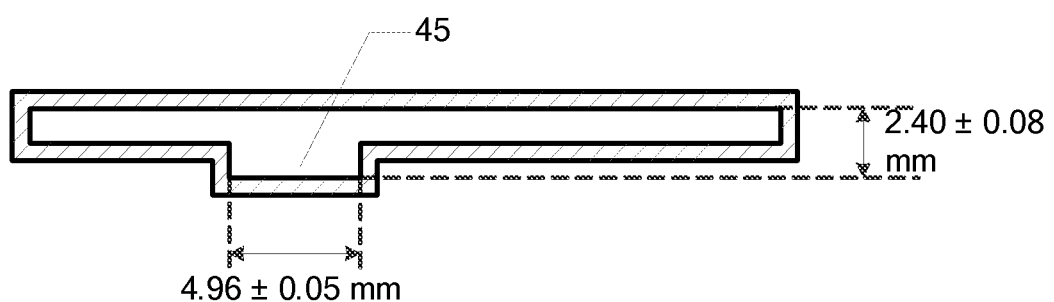
FIG. 7 is a simplified side view of a female connector from a slot side.

In addition, the female connector 40 includes a first face and a second face. The first face and the second face are opposite to each other. FIG. 6 shows the first face 40a of the female connector 40. A limiting structure 45 is arranged on the first face 40a of the female connector 40. The limiting structure 45 is a groove. In FIG. 6, the groove is indicated by a dotted ellipse. Referring to FIG. 7, FIG. 7 is a simplified side view of the female connector 40 from a slot side. A length of the limiting structure 45 (that is, the groove) is 4.96 ± 0.05 mm, and a height of the limiting structure 45 is 2.40 ± 0.08 mm.

As shown in FIG. 6, the first pin 41 is located in the middle of the first face 40a of the female connector 40. The middle means that a distance between the first pin 41 and a pin at one end of the first face 40a of the female connector 40 is the same as or close to a distance between the first pin 41 and a pin at the other end of the first face 40a of the female connector 40. However, the middle does not mean that the distance between the first pin 41 and the pin at one end of the first face 40a of the female connector 40 must be the same as the distance between the first pin 41 and the pin at the other end of the first face 40a of the female connector 40. In other words, the middle is not limited to that the first pin 41 is located in the very middle of the first face 40a of the female connector 40.

Figure 8:
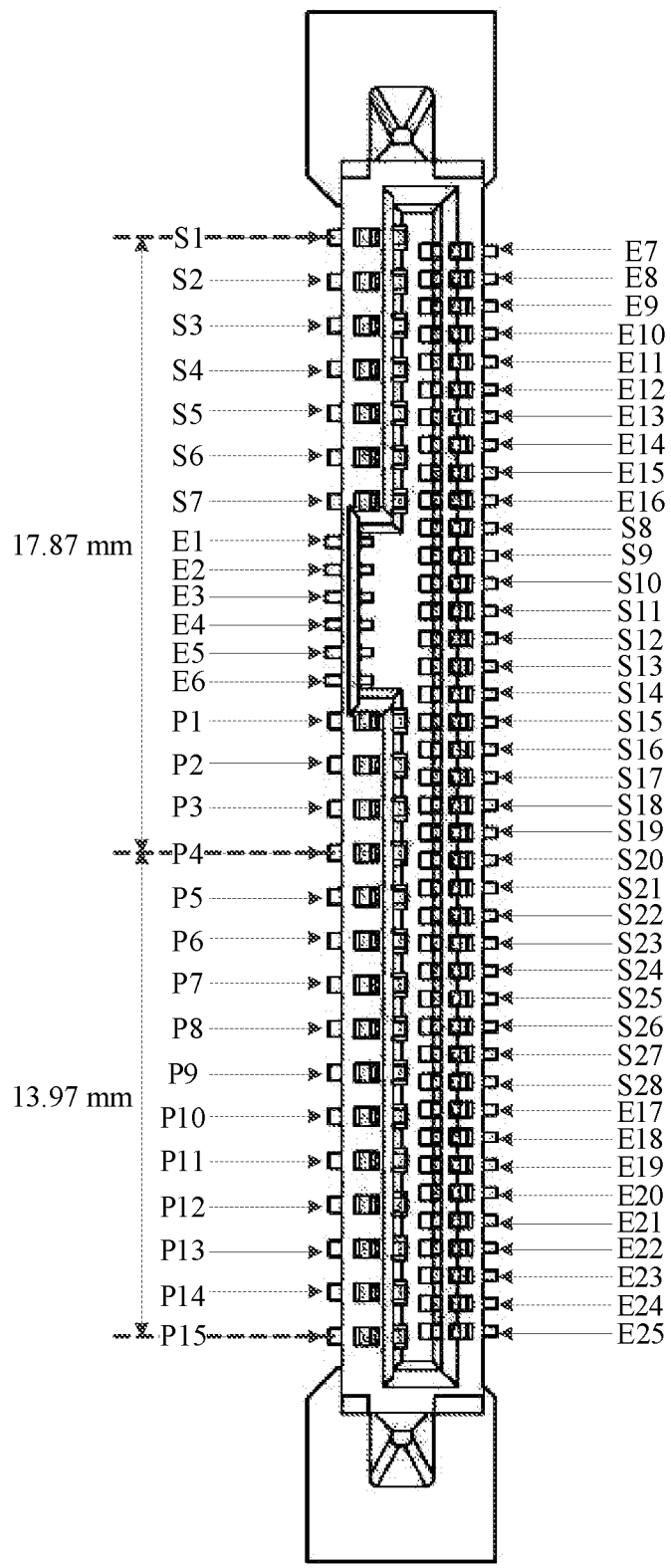
FIG. 8 is another schematic diagram of a female connector.

Referring to FIG. 8, FIG. 8 is another schematic diagram of the female connector 40. When the female connector 40 is a female connector of the SFF-8639 connector, pins S1 to S7, E1 to E6, and P1 to P15, which total 28 pins, are arranged on the first face 40a of the female connector 40. The 28 pins are arranged one by one from a first end of the female connector 40 to a second end of the female connector 40 according to a sequence of the pins S1 to S7, E1 to E6, and P1 to P15. The pins E1 to E6 are arranged on a position on the groove. The pins S1 to S7 are located on a side, close to the first end of the female connector 40, of the groove, and the pins P1 to P15 are located on a side, close to the second end of the female connector 40, of the groove. Pins E7 to E16, S8 to S28, and E17 to E25, which total 40 pins, are arranged on the second face of the female connector 40. The 40 pins are arranged one by one from the first end of the female connector 40 to the second end of the female connector 40 according to a sequence of the pins E7 to E16, S8 to S28, and E17 to E25. Of the foregoing pins, a pin P4 is configured to indicate the in-service signal of the NVMe storage device. To be specific, the first pin 41 is the pin P4.

The first pin 41 (that is, the pin P4) is arranged on the first face 40a of the female connector 40, and is the seventeenth pin counted from the first end of the female connector 40.

Optionally, the distance between the first pin 41 and the pin at one end of the first face 40a of the female connector 40 is 17.87 mm, and the distance between the first pin 41 and the pin at the other end of the first face 40a of the female connector is 13.97 mm. To be specific, as shown in FIG. 8, a distance between the first pin 41 (that is, the pin P4) and a first edge pin (that is, the pin S1) at one end of the first face 40a of the female connector 40 is 17.87 mm, and a distance between the first pin 41 (that is, the pin P4) and a second edge pin (that is, the pin P15) at the other end of the first face 40a of the female connector 40 is 13.97 mm. The distance between two pins is a distance between a central line position of a golden finger of one pin and a central line position of a golden finger of the other pin.

In addition, the pins of the female connector 40 include long pins and short pins. A long pin is longer than a short pin, and a difference between a length of a long pin and a length of a short pin is greater than or equal to 0.35 mm. A distance between a long pin and the side edge of the slot of the female connector 40 is 1.40 ± 0.15 mm, and a distance between a short pin and the side edge of the slot of the female connector 40 is 1.90 ± 0.15 mm. To be specific, when the first pin 41 (that is, the pin P4) is a short pin, a distance between the first pin 41 (that is, the pin P4) and the side edge of the slot of the female connector 40 is 1.90 ± 0.15 mm; or when the first pin 41 (that is, the pin P4) is a long pin, a distance between the first pin 41 (that is, the pin P4) and the side edge of the slot of the female connector 40 is 1.40 ± 0.15 mm.

In the solutions provided in this embodiment of this application, lengths of the pins of the female connector 40 are changed, so that for the female connector 40, the pins respectively configured to indicate the in-service signal, the power supply signal, the clock signal, and the PCIe port signal have an equal length, or the length of the pin configured to indicate the in-service signal is not greater than the lengths of the pins respectively configured to indicate the power supply signal, the clock signal, and the PCIe port signal. In this way, the in-service signal can more accurately reflect a state of the NVMe storage device when the NVMe storage device is inserted or removed, thereby avoiding the following problem: The NVMe storage device cannot successfully access a system when the NVMe storage device is removed and inserted.

Figure 9:
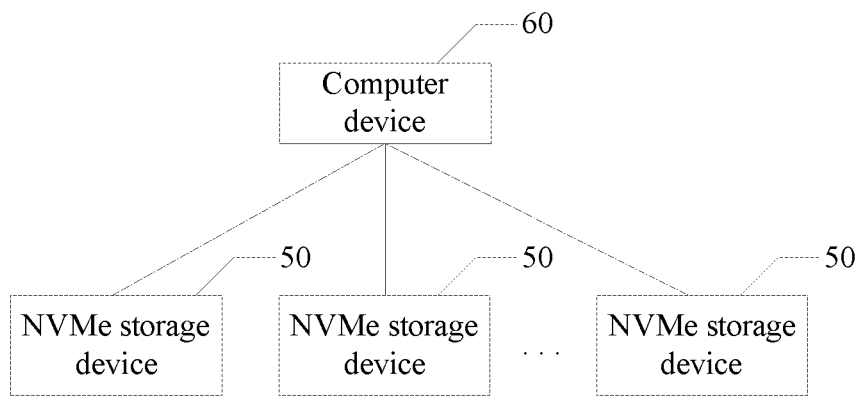
FIG. 9 is a schematic diagram of a storage system according to an embodiment of this application.

Referring to FIG. 9, FIG. 9 is a schematic diagram of a storage system according to an embodiment of this application. The storage system includes an NVMe storage device 50 and a computer device 60.

Optionally, there are one or more NVMe storage devices 50. The NVMe storage device 50 may be an NVMe SSD. The computer device 60 may be a computer, a storage array (or referred to as an array cabinet), or a server. The computer device 60 may be referred to as a host. At least one slot is formed on the computer device 60, and one NVMe storage device 50 can be inserted into each slot. The NVMe storage device 50 and the computer device 60 are connected to each other by using the connector provided in the foregoing embodiments. Optionally, the connector is an SFF-8639 connector defined in related standards, such as SFF-8639 Specification for Multifunction 12 Gb/s 6X Unshielded Connector, PCI Express ® SFF-8639 Module Specification, and Copyright © 2012 SSD Form Factor Work Group, All rights reserved.

Figure 10:
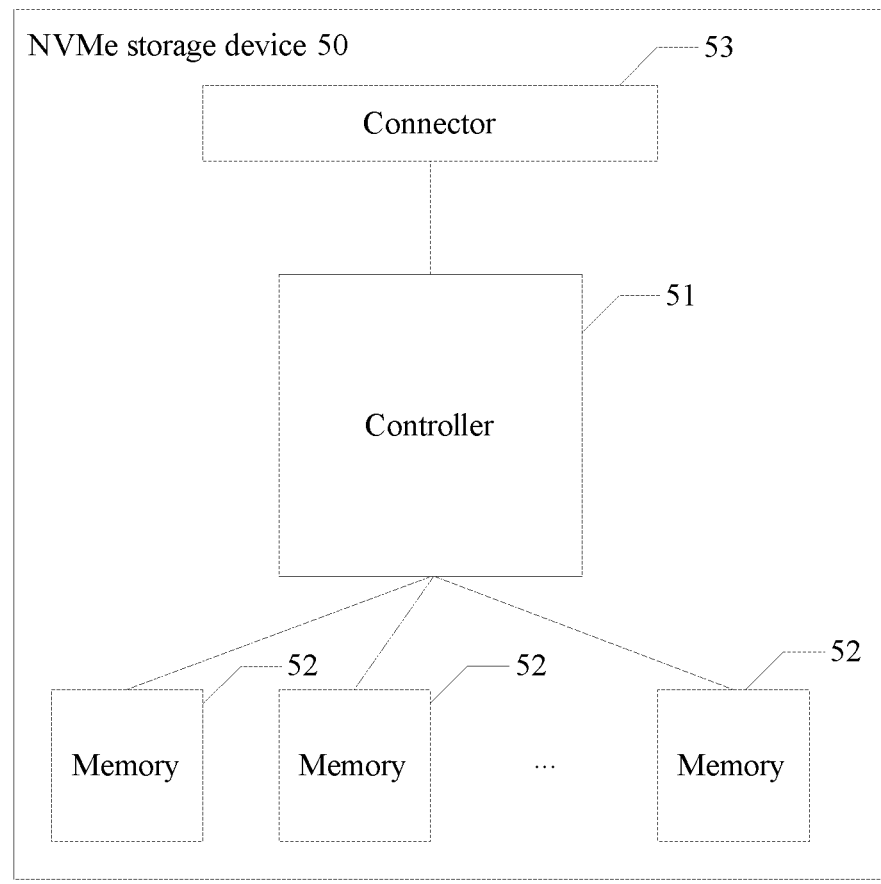
FIG. 10 is a structural block diagram of an NVMe storage device according to an embodiment of this application.
Figure 11:
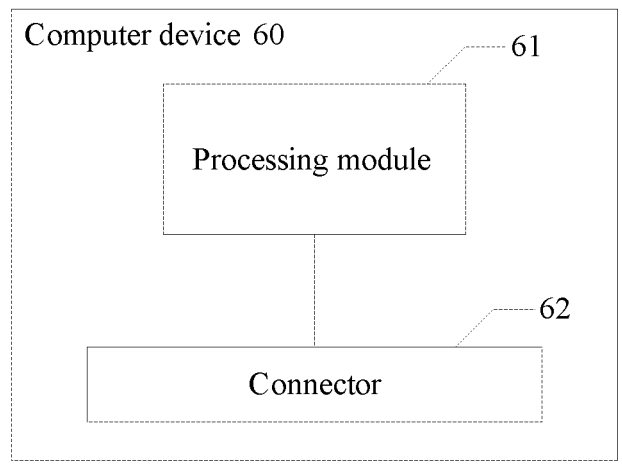
FIG. 11 is a structural block diagram of a computer device according to an embodiment of this application.

In the foregoing embodiments shown in FIG. 10 and FIG. 11, the NVMe storage device 50 and the computer device 60 are described separately.

Referring to FIG. 10, FIG. 10 is a structural block diagram of an NVMe storage device 50 according to an embodiment of this application. The NVMe storage device 50 includes a controller 51, a memory 52, and a connector 53.

The controller 51 is electrically connected to the memory 52 and the connector 53. The controller 51 is mainly responsible for data communication with the computer device 60, and is configured to read data from or write data into the memory 52 based on a read/write request from the computer device 60. The controller 51 communicates with the computer device 60 by using a PCIe bus. The memory 62 is configured to store data. Optionally, the memory 62 is a Flash memory or a DRAM.

Optionally, a size of the NVMe storage device 50 includes but is not limited to 3.5 inches, 2.5 inches, or 1.8 inches.

Optionally, the connector 53 of the NVMe storage device 50 is a male connector, for example, a male connector of an SFF-8639 connector. For description about the male connector, refer to the foregoing embodiment shown in FIG. 3. Details are not described again in this embodiment.

Optionally, the computer device 60 into which the NVMe storage device 50 is inserted also includes a connector. The connector 53 of the NVMe storage device 50 is connected to the connector of the computer device 60. Usually, the connector 53 of the NVMe storage device 50 is a male connector, and the connector of the computer device 60 is a female connector. In other possible examples, the connector 53 of the NVMe storage device 50 is a female connector, and the connector of the computer device 60 is a male connector. This is not limited in this embodiment of this application.

When two pins that are in contact with corresponding pins and that are respectively in the connector 53 of the NVMe storage device 50 and in the connector of the computer device 60 are both long pins, a contact sequence of the two pins is 1st, in other words, a time at which the two pins come into contact is the earliest. In two pins that are in contact with corresponding pins and that are respectively in the connector 53 of the NVMe storage device 50 and in the connector of the computer device 60, when one of the two pins is a long pin and the other is a short pin, a contact sequence of the two pins is 2nd, in other words, a contact time of the two pins is later than a contact time of a pin whose contact sequence is 1st. When two pins that are in contact with corresponding pins and that are respectively in the connector 53 of the NVMe storage device 50 and in the connector of the computer device 60 are both short pins, a contact sequence of the two pins is 3rd, and a contact time of the two pins is later than a contact time of a pin whose contact sequence is 2nd. In a possible case, when a first pin of the connector 53 of the NVMe storage device 50 is a short pin to indicate an in-service signal and a first pin of the connector of the computer device 60 is also a short pin to indicate an in-service signal, a contact sequence of the two first pins is 3rd.

Comparing with other approaches, in the solutions provided in this embodiment of this application, lengths of pins of the connector are changed, so that pins of the connector respectively configured to indicate the in-service signal, a power supply signal, a clock signal, and a PCIe port signal have an equal length, or a length of the pin configured to indicate the in-service signal is not greater than lengths of pins respectively configured to indicate the power supply signal, the clock signal, and the PCIe port signal. For example, a first pin of a male connector and a first pin of a female connector are both changed from long pins to short pins, so that a contact sequence of the first pins changes from 1st to 3rd. In this way, it can be ensured that the NVMe storage device 50 can successfully access a system in the foregoing two removal and insertion scenarios. Specifically:

1. Scenario in which the NVMe storage device 50 is slowly inserted

In a process of inserting the NVMe storage device 50 into a slot of the computer device 60, the length of the first pin (that is, a pin P4 of the SFF-8639 connector) is the same as lengths of pins for a power supply, a clock, and a PCIe port. Therefore, when the first pin is in contact with corresponding pin, each of the pins for the power supply, the clock, and the PCIe port is also in contact with corresponding pin. At this moment, an in-service signal IFDET# changes from 1 to 0, indicating that the NVMe storage device 50 is in service. When detecting that the in-service signal IFDET# changes from 1 to 0, the system reports a disk insertion interrupt. A PCIe hot swapping controller in the system enables the power supply, the clock, and the PCIe port for the slot successively, to start a hot-add process. In this case, each of the pins for the power supply, the clock, and the PCIe port is already in contact with corresponding pins. Therefore, the hot-add process may be successfully executed so that the NVMe storage device 50 successfully accesses the system.

2. Scenario in which the NVMe storage device 50 is slowly removed but inserted back again before the NVMe storage device 50 is completely removed In a process of removing the NVMe storage device 50 from a slot of the computer device 60, the length of the first pin (that is, a pin P4 of the SFF-8639 connector) is the same as lengths of pins for a power supply, a clock, and a PCIe port. Therefore, when the pins for the power supply, the clock, and the PCIe port are disconnected, the first pin is also disconnected and an in-service signal IFDET# changes from 0 to 1, indicating that the NVMe storage device 50 is not in service. In this case, a PCIe link is disconnected, and DPC is triggered to isolate the NVMe storage device 50 and disable the PCIe port. When the NVMe storage device 50 is not completely removed, if the removal stops and the NVMe storage device 50 is inserted back again, the in-service signal IFDET# changes from 1 to 0, indicating that the NVMe storage device 50 is in service. When detecting that the in-service signal IFDET# changes from 1 to 0, the system reports a disk insertion interrupt. A PCIe hot swapping controller in the system enables the power supply, the clock, and the PCIe port for the slot successively, to start a hot-add process. After the hot-add process is executed, the NVMe storage device 50 successfully accesses the system again.

In the solutions provided in this embodiment of this application, the lengths of the pins of the connector are changed, so that the pins of the connector respectively configured to indicate the in-service signal, the power supply signal, the clock signal, and the PCIe port signal have an equal length, or the length of the pin configured to indicate the in-service signal is not greater than the lengths of the pins respectively configured to indicate the power supply signal, the clock signal, and the PCIe port signal. In this way, the in-service signal can more accurately reflect a state of the NVMe storage device when the NVMe storage device is inserted or removed, thereby avoiding the following problem: The NVMe storage device cannot successfully access the system when the NVMe storage device is removed and inserted.

Referring to FIG. 11, FIG. 11 is a structural block diagram of a computer device 60 according to an embodiment of this application. The computer device 60 includes a processing module 61 and a connector 62.

The processing module 61 is electrically connected to the connector 62. The processing module 61 is configured to control and manage an action of the computer device 60, for example, send a read/write request to the NVMe storage device 50 to read data from or write data into the NVMe storage device 50. The processing module 61 communicates with the NVMe storage device 50 by using a PCIe bus.

Optionally, the connector 62 of the computer device 60 is a female connector, for example, a female connector of an SFF-8639 connector. For description about the female connector, refer to the foregoing embodiment shown in FIG. 6. Details about the female connector are not described again in this embodiment.

Optionally, the NVMe storage device 50 inserted into the computer device 60 also includes a connector. The connector of the NVMe storage device 50 is connected to the connector 62 of the computer device 60. Usually, the connector of the NVMe storage device 50 is a male connector, and the connector 62 of the computer device 60 is a female connector. In other possible examples, the connector of the NVMe storage device 50 is a female connector, the connector 62 of the computer device 60 is a male connector, and this is not limited in this embodiment of this application.

When two pins that are in contact with corresponding pins and that are respectively in the connector of the NVMe storage device 50 and in the connector 62 of the computer device 60 are both long pins, a contact sequence of the two pins is 1st. In two pins that are in contact with corresponding pins and that are respectively in the connector of the NVMe storage device 50 and in the connector 62 of the computer device 60, when one of the two pins is a long pin and the other pin is a short pin, a contact sequence of the two pins is 2nd. When two pins that are in the contact and that are respectively in the connector of the NVMe storage device 50 and in the connector 62 of the computer device 60 are both short pins, a contact sequence of the two pins is 3rd. In a possible case, when a first pin of the connector of the NVMe storage device 50 is a short pin to indicate an in-service signal and a first pin of the connector 62 of the computer device 60 is also a short pin to indicate an in-service signal, a contact sequence of the two first pins is 3rd.

Comparing with other approaches, in the solutions provided in this embodiment of this application, lengths of pins of the connector are changed, so that pins of the connector respectively configured to indicate the in-service signal, a power supply signal, a clock signal, and a PCIe port signal have an equal length, or a length of the pin configured to indicate the in-service signal is not greater than lengths of pins respectively configured to indicate the power supply signal, the clock signal, and the PCIe port signal. For example, a first pin of a male connector and a first pin of a female connector are both changed from long pins to short pins, so that a contact sequence of the first pins changes from 1st to 3rd. In this way, it can be ensured that the NVMe storage device 50 can successfully access a system in the two removal and insertion scenarios mentioned previously. For detailed analysis, refer to the description given in the embodiment shown in FIG. 10. Details are not described herein again.

Figure 12:
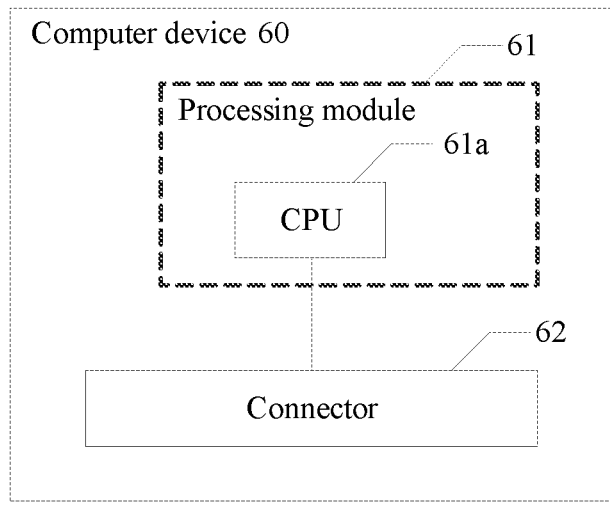
FIG. 12 is a structural block diagram of a computer device according to another embodiment of this application.

In an example, as shown in FIG. 12, the processing module 61 includes a CPU 61a. The CPU 61a is electrically connected to the connector 62, for example, by using a PCIe bus. The CPU 61a is configured to control and manage an action of the computer device 60, and functions of the CPU 61a are mainly interpreting a computer instruction and processing data in computer software.

Figure 13:
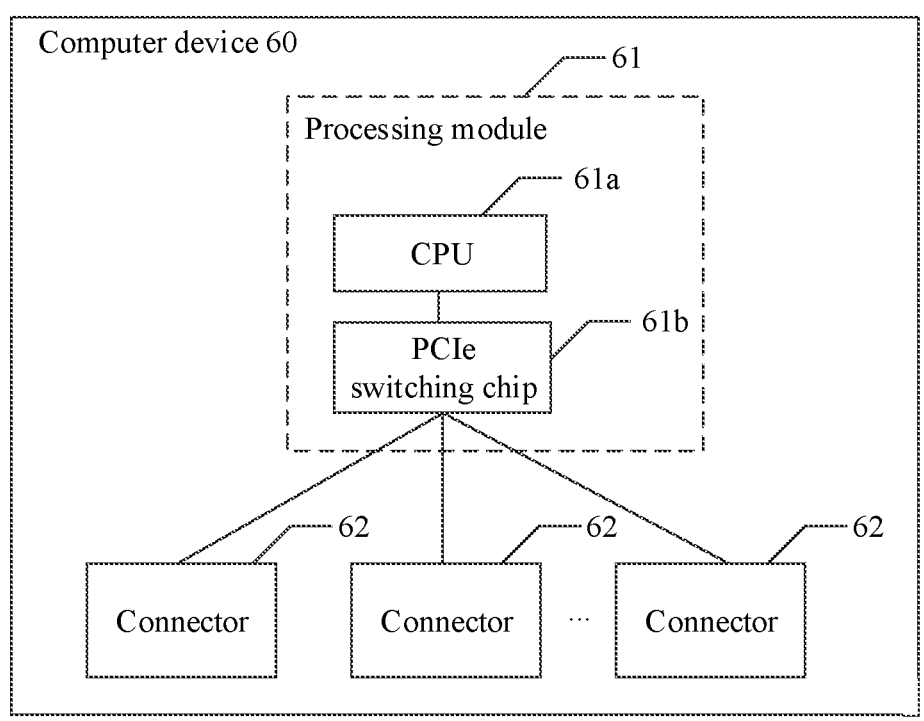
FIG. 13 is a structural block diagram of a computer device according to still another embodiment of this application.

In another example, as shown in FIG. 13, the processing module 61 includes a CPU 61a and a PCIe switching chip 61b. The PCIe switching chip 61b includes an input port and N output ports, where N is a positive integer. The CPU 61a is electrically connected to the input port, for example, by using a PCIe bus. Each of the N output ports is configured to electrically connect to one connector 62, for example, by using a PCIe bus. With the PCIe switching chip 61b in place, the CPU 61a can simultaneously communicate with a plurality of NVMe storage devices 50.

Optionally, the processing module 61 further includes a baseboard management controller (BMC) and a complex programmable logic device (CPLD). The BMC and the CPLD are mainly configured to perform auxiliary management on signals, such as a power supply signal, a clock signal, and an in-service signal, of the NVME storage device 50. If functions of the BMC and the CPLD are integrated in the CPU 61a or the PCIe switching chip 61b, the BMC and the CPLD can be omitted.

In the solutions provided in this embodiment of this application, the lengths of the pins of the connector are changed, so that the pins of the connector respectively configured to indicate the in-service signal, the power supply signal, the clock signal, and the PCIe port signal have an equal length, or the length of the pin configured to indicate the in-service signal is not greater than the lengths of the pins respectively configured to indicate the power supply signal, the clock signal, and the PCIe port signal. In this way, the in-service signal can more accurately reflect the inserted or removed state of the NVMe storage device, thereby avoiding the following problem: The NVMe storage device cannot successfully access the system when the NVMe storage device is removed and inserted.

It needs to be noted that, without changing the lengths of the pins of the existing SFF-8639 connector respectively configured to indicate the power supply signal, the clock signal, and the PCIe port signal (that is, when the pins respectively configured to indicate the power supply signal, the clock signal, and the PCIe port signal are short pins), if a pin (that is, a pin P4) that is of the SFF-8639 connector included in the NVMe storage device and that is configured to indicate the in-service signal is changed from a long pin to a short pin, and if a pin (that is, a pin P4) that is of the SFF-8639 connector included in the computer device and that is configured to indicate the in-service signal is also changed from a long pin to a short pin, a contact sequence of the two pins P4 is 3rd. In this way, the following problem can be avoided: The NVMe storage device cannot successfully access the system when the NVMe storage device is removed and inserted. In another possible embodiment, the pin P4 of the SFF-8639 connector included in the NVMe storage device may be changed from a long pin to a short pin, whereas the pin P4 of the SFF-8639 connector included in the computer device remains a long pin. Alternatively, the pin P4 of the SFF-8639 connector included in the computer device is changed from a long pin to a short pin, whereas the pin P4 of the SFF-8639 connector included in the NVMe storage device is still a long pin. In this way, a contact sequence of the two pins P4 is 2nd, thereby reducing a probability of the following problem to an extent when compared with other approaches: The NVMe storage device cannot successfully access the system when the NVMe storage device is removed and inserted.

In addition to underlying layer hardware such as the CPU 61a and the PCIe switching chip 61b described above, the processing module 61 of the computer device 60 further includes the following software: a device management driver, a PCIe driver, and an NVMe driver. The device management driver is mainly configured to report an in-service signal and support data transferring between the underlying hardware and the PCIe driver. The PCIe driver is mainly configured to execute a hot swapping process (including a hot-add process and a hot-remove process). The NVMe driver is mainly configured to support normal running of the NVMe storage device 50. The foregoing software may be stored in a memory of the computer device 60, and is loaded and executed by the CPU 61a.

Figure 14:
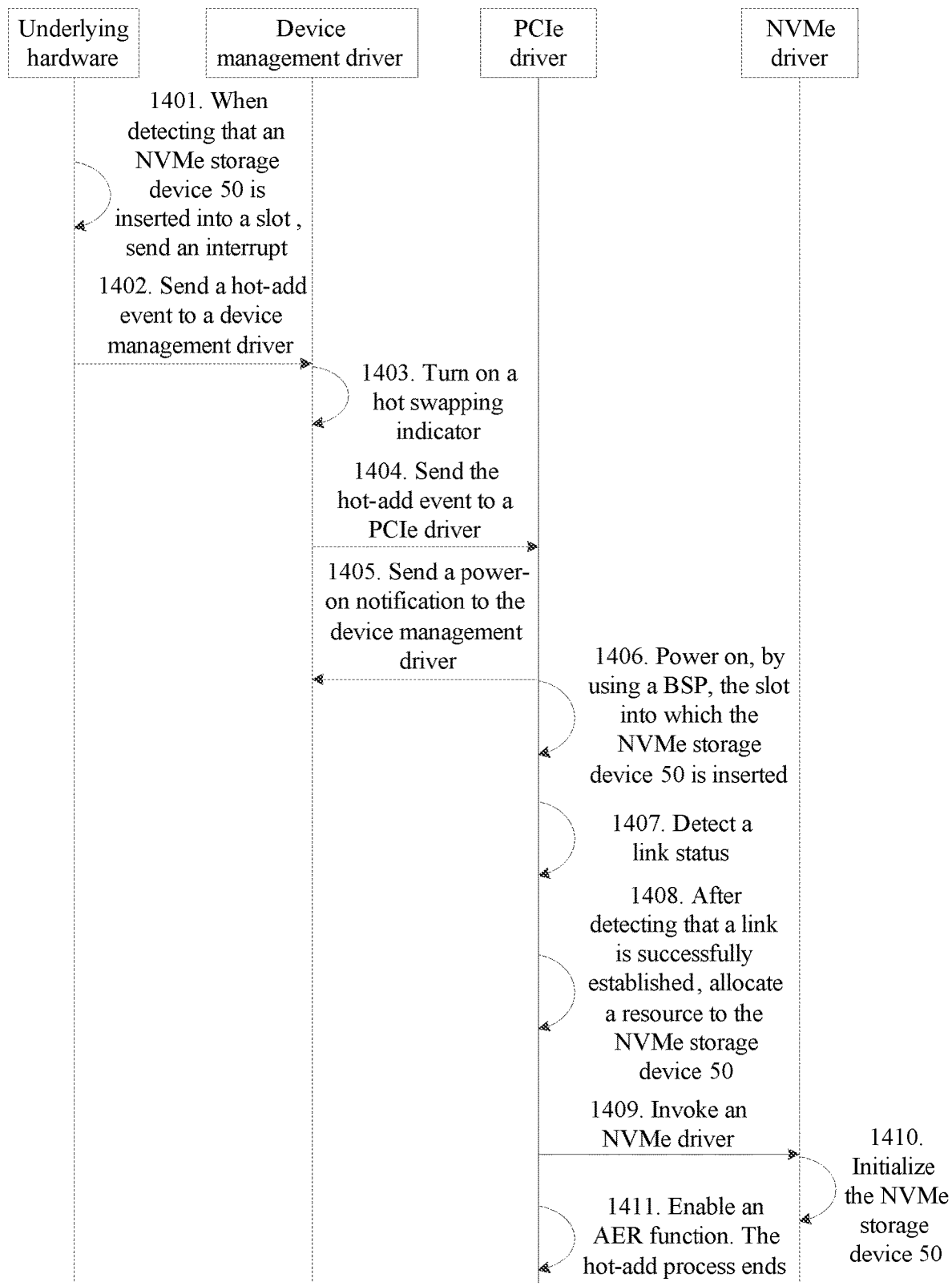
FIG. 14 is a schematic diagram of a hot-add process according to an embodiment of this application.
Figure 15A:
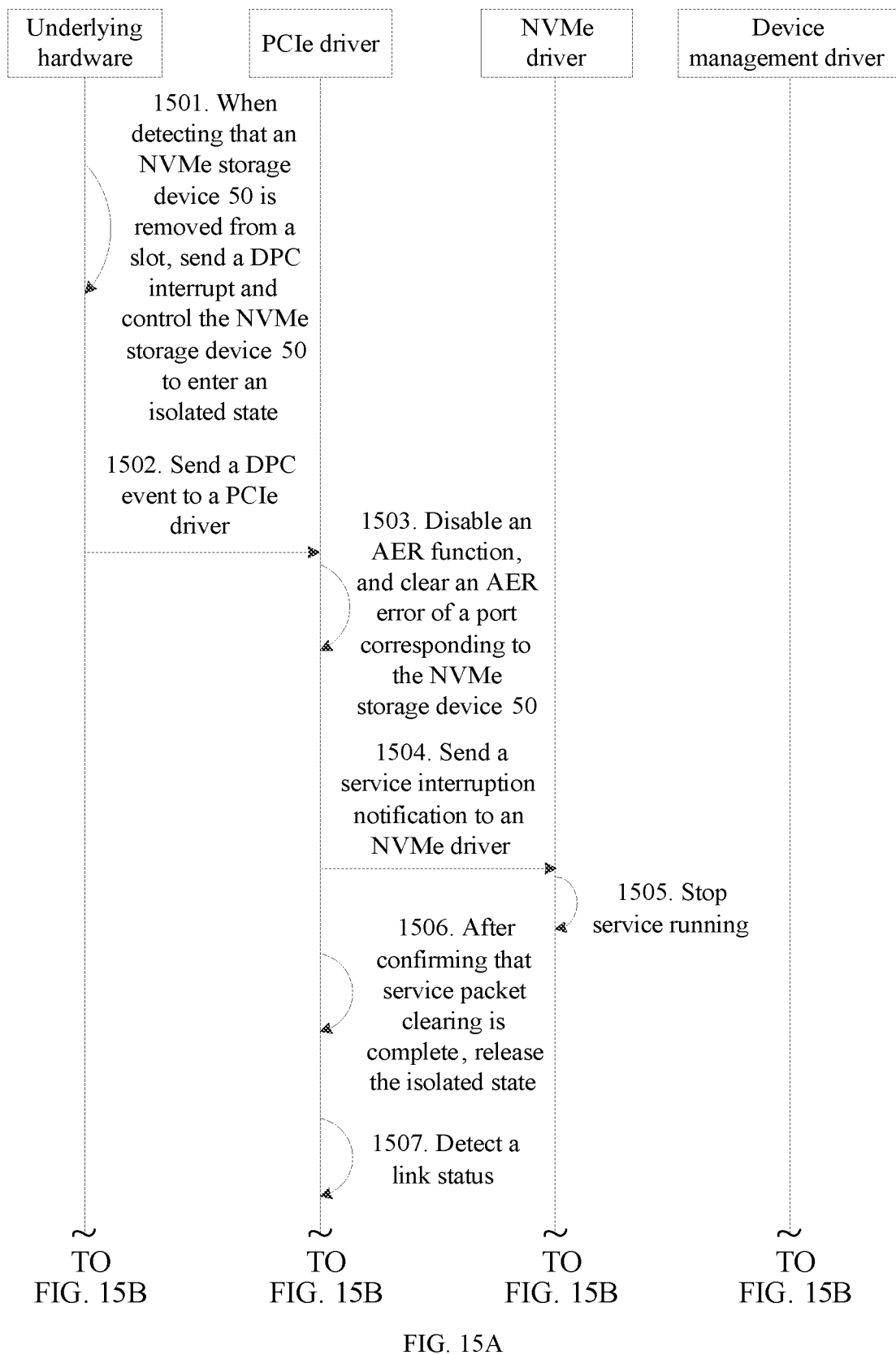
FIG. 15A and FIG. 15B are a schematic diagram of a hot-remove process according to an embodiment of this application.
Figure 15B:
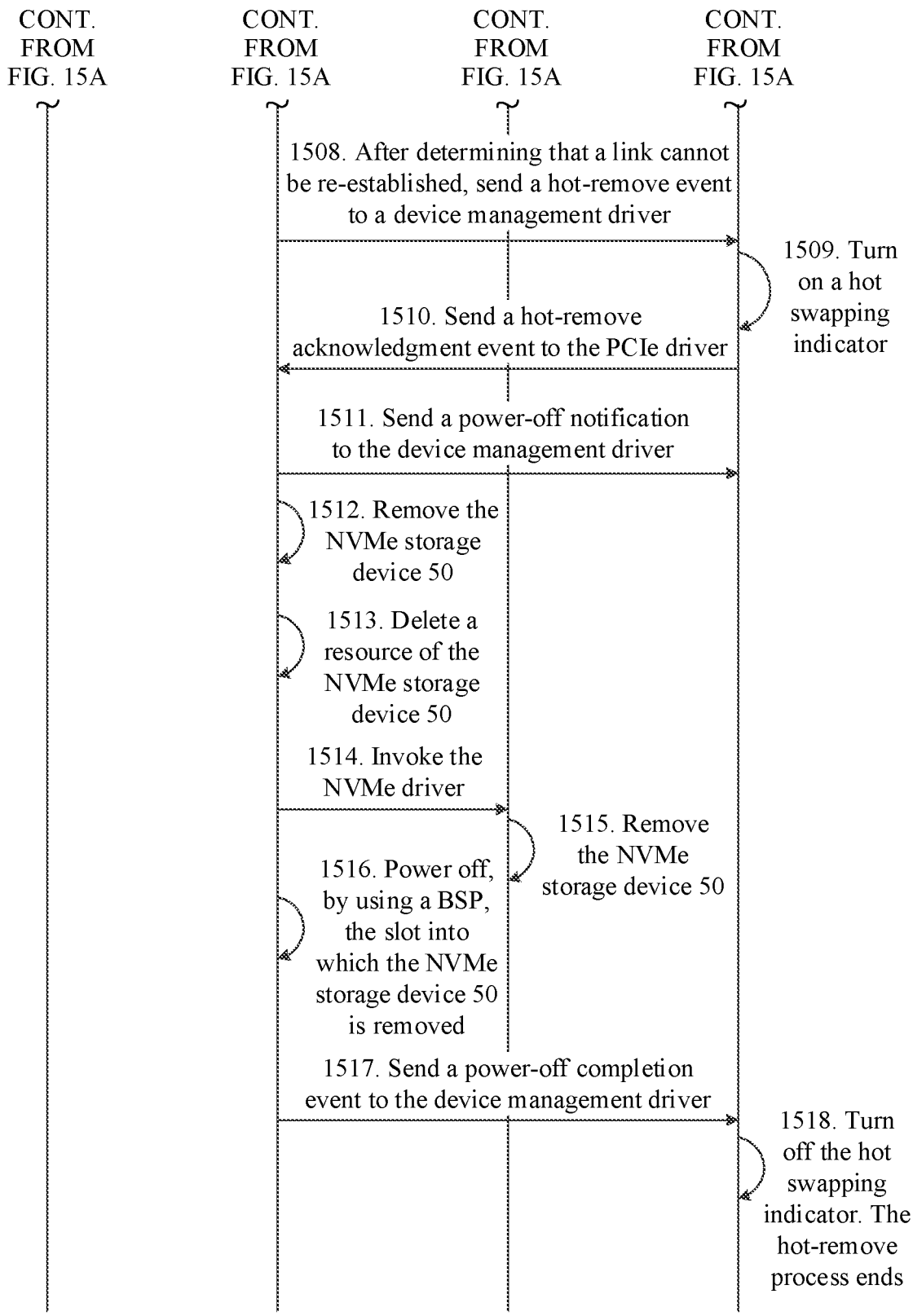

The following describes, by using embodiments shown in FIG. 14, FIG. 15A, and FIG. 15B, a corresponding hot-add process and a hot-remove process respectively after the pins of the connector configured to indicate the in-service signal, the power supply signal, the clock signal, and the PCIe port signal are adjusted to a same length, or after the pin of the connector configured to indicate the in-service signal is adjusted to a length not greater than the lengths of the pins respectively configured to indicate the power supply signal, the clock signal, and the PCIe port signal.

Referring to FIG. 14, FIG. 14 is a schematic diagram of a hot-add process. The hot-add process may include the following steps.

Step 1401: When detecting that an NVMe storage device 50 is inserted into a slot, underlying hardware sends an interrupt.

When the underlying hardware detects that an in-service signal IFDET# changes from 1 to 0, it indicates that the NVMe storage device 50 is inserted into a slot, and the underlying hardware sends an interrupt.

Step 1402: The underlying hardware sends a hot-add event to a device management driver.

Step 1403: The device management driver turns on a hot swapping indicator.

Step 1404: The device management driver sends the hot-add event to a PCIe driver.

Optionally, after receiving the hot-add event, the device management driver detects whether the hot-add event is legal. If the hot-add event is legal, steps 1403 and 1404 are performed. If the hot-add event is illegal, the process ends.

In addition, step 1403 may be performed before or after step 1404, or step 1403 and step 1404 may be simultaneously performed. This is not limited in this embodiment of this application.

Step 1405: After receiving the hot-add event, the PCIe driver sends a power-on notification to the device management driver.

The power-on notification is used to notify the device management driver that the PCIe driver is to power on the slot into which the NVMe storage device 50 is inserted.

Step 1406: The PCIe driver powers on, by using a board support package (BSP), the slot into which the NVMe storage device 50 is inserted.

Accordingly, the underlying hardware turns on a power indicator of the slot into which the NVMe storage device 50 is inserted.

Step 1405 may be performed before or after step 1406, or step 1405 and step 1406 may be simultaneously performed. This is not limited in this embodiment of this application.

Step 1407: The PCIe driver detects a link status, where the link status is used to indicate whether a PCIe link has been successfully established.

Optionally, the PCIe driver polls the underlying hardware to learn the link status. Duration of the polling process may be preset, for example, to 2 seconds; or a quantity of polling times in the polling process may be preset, for example, to 3.

Step 1408: After detecting that the link is successfully established, the PCIe driver allocates a resource to the NVMe storage device 50.

For example, the resource includes memory address space.

Step 1409: The PCIe driver invokes an NVMe driver.

Step 1410: After being invoked, the NVMe driver initializes the NVMe storage device 50.

For example, the NVMe driver initializes a capacity, a partition, and the like of the NVMe storage device 50.

Step 1411: The PCIe driver enables an advanced error reporting (AER) function, and the hot-add process ends.

Referring to FIG. 15A and FIG. 15B, FIG. 15A and FIG. 15B are a schematic diagram of a hot-remove process. The hot-remove process may include the following steps.

Step 1501: When detecting that an NVMe storage device 50 is removed from a slot, underlying hardware sends a DPC interrupt and controls the NVMe storage device 50 to enter an isolated state.

When the underlying hardware detects that an in-service signal IFDET# changes from 0 to 1 or a PCIe link is disconnected, which indicates that the NVMe storage device 50 is removed from the slot, the underlying hardware sends a DPC interrupt. In this embodiment of this application, pins of a connector respectively configured to indicate an in-service signal, a power supply signal, a clock signal, and a PCIe port signal are adjusted to a same length, or a pin of a connector configured to indicate an in-service signal is adjusted to a length not greater than lengths of pins respectively configured to indicate a power supply signal, a clock signal, and a PCIe port signal. Therefore, in a process of removing the NVMe storage device 50 from the slot, a change in the in-service signal and disconnection of the PCIe link occurs basically at the same time, or a change in the in-service signal occurs before disconnection of the PCIe link. The underlying hardware can determine, based on occurrence of either event (the change in the in-service signal or the disconnection of the PCIe link), that the NVMe storage device 50 is removed from the slot.

In addition, controlling the NVMe storage device 50 to enter the isolated state is to protect a system from being affected by a hot-remove event and avoid an exception or an error such as timeout or suspension.

Step 1502: The underlying hardware sends a DPC event to a PCIe driver.

Step 1503: The PCIe driver disables an AER function, and clears an AER error of a port corresponding to the NVMe storage device 50.

Optionally, after receiving the DPC event, the PCIe driver detects whether the DPC event is legal. If the DPC event is legal, the PCIe driver disables the AER function. If the DPC event is illegal, the process ends.

Step 1504: The PCIe driver sends a service interruption notification to an NVMe driver.

Step 1505: After receiving the service interruption notification, the NVMe driver stops service running.

Step 1506: After confirming that service packet clearing is complete, the PCIe driver releases the isolated state.

Step 1507: The PCIe driver detects a link status.

Optionally, the PCIe driver polls the underlying hardware to learn the link status. Duration of the polling process may be preset, for example, to 2 seconds; or a quantity of polling times in the polling process may be preset, for example, to 3.

Step 1508: After determining that a link cannot be re-established, the PCIe driver sends a hot-remove event to the device management driver.

Step 1509: After receiving the hot-remove event, the device management driver turns on a hot swapping indicator.

Step 1510: The device management driver sends a hot-remove acknowledgment event to the PCIe driver.

Step 1511: After receiving the hot-remove acknowledgment event, the PCIe driver sends a power-off notification to the device management driver.

The power-off notification is used to notify the device management driver that the PCIe driver is to power off the slot into which the NVMe storage device 50 is removed.

Step 1512: The PCIe driver removes the NVMe storage device 50.

Step 1513: The PCIe driver deletes a resource of the NVMe storage device 50.

For example, the resource includes memory address space.

Step 1514: The PCIe driver invokes the NVMe driver.

Step 1515: After being invoked, the NVMe driver removes the NVMe storage device 50.

Step 1516: The PCIe driver powers off, by using a BSP, the slot into which the NVMe storage device 50 is inserted.

Accordingly, the underlying hardware turns off a power indicator of the slot into which the NVMe storage device 50 is inserted.

Step 1517: The PCIe driver sends a power-off completion event to the device management driver.

Step 1518: The device management driver turns off the hot swapping indicator, and the hot-remove process ends.

It should be understood that "a plurality of" refers to two or more than two in this specification. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "First", "second" and similar terms used in this specification do not represent any sequence, quantity, or importance, but are only intended to distinguish different objects.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A connector comprising:
a first pin comprising a first length and configured to indicate an in-service signal of an NVM Express (NVMe) storage device;
a second pin comprising a second length and configured to indicate a power supply signal of the NVMe storage device;
a third pin comprising a third length and configured to indicate a clock signal of the NVMe storage device; and
a fourth pin comprising a fourth length and configured to indicate a Peripheral Component Interconnect Express (PCIe) port signal of the NVMe storage device,
wherein the first length, the second length, the third length, and the fourth length meet one or more preset conditions to enable the connector to provide a PCIe communications interface that connects the NVMe storage device and a computer device, wherein the one or more preset conditions include the first length is less than the second length, the first length is equal to or less than the third length, and the first length is equal to or less than the fourth length, wherein the connector further comprises a first face and a second face, a limiting structure is arranged on the first face, the limiting structure is a boss or a groove, and the first pin is located in the middle of the first face.

2. The connector of claim 1, further comprising the boss, wherein the boss is the limiting structure of the connector, and wherein the connector is a male connector.

3. The connector of claim 2, wherein the first length is 4.55 millimeters (mm) ± 0.08 mm.

4. The connector of claim 1, further comprising:
the groove that is athe limiting structure of the connector; and
a slot comprising a side edge,
wherein the connector is a female connector, and
wherein a distance between the first pin and the side edge is 1.90 millimeters (mm) 0.15 mm.

5. The connector of claim 1, further comprising:
the first face comprising a first end and a second end;
a first edge pin located at the first end; and
a second edge pin located at the second end,
wherein a first distance between the first pin and the first edge pin is 17.87 millimeters (mm), and
wherein a second distance between the first pin and the second edge pin is 13.97 mm.

6. The connector of claim 1, wherein the one or more preset conditions enable the in-service signal to accurately reflect an inserted or removed state of the NVMe storage device.

7. The connector of claim 1, wherein the first pin is configured to have a contact sequence later than that of the second pin and not earlier than that of the shortest pin among the third pin and the fourth pin, when the NVMe storage device is inserted in the computer device.

8. An NVM Express (NVMe) storage device comprising:
a connector comprising:
a first pin comprising a first length and configured to indicate an in-service signal of the NVMe storage device;
a second pin comprising a second length and configured to indicate a power supply signal of the NVMe storage device;
a third pin comprising a third length and configured to indicate a clock signal of the NVMe storage device; and
a fourth pin comprising a fourth length and configured to indicate a Peripheral Component Interconnect Express (PCIe) port signal of the NVMe storage device,
wherein the first length, the second length, the third length, and the fourth length meet one or more preset conditions to enable the connector to provide a PCIe communications interface that connects the NVMe storage device and a computer device, wherein the one or more preset conditions include the first length is less than the second length, the first length is equal to or less than the third length, and the first length is equal to or less than the fourth length, wherein the connector further comprises a first face and a second face, a limiting structure is arranged on the first face, the limiting structure is a boss or a groove, and the first pin is located in the middle of the first face.

9. The NVMe storage device of claim 8, further comprising the boss, wherein the boss is the limiting structure of the connector, and wherein the connector is a male connector.

10. The NVMe storage device of claim 9, wherein the first length is 4.55 millimeters (mm) ± 0.08 mm.

11. The NVMe storage device of claim 8, wherein the connector further comprises:
the groove that is the limiting structure of the connector; and
a slot comprising a side edge,
wherein the connector is a female connector, and
wherein a distance between the first pin and the side edge is 1.90 millimeters (mm) 0.15 mm.

12. A computer device comprising:
an NVM Express (NVMe) storage device comprising a connector, wherein the connector comprises:
a first pin comprising a first length and configured to indicate an in-service signal of the NVMe storage device;
a second pin comprising a second length and configured to indicate a power supply signal of the NVMe storage device;
a third pin comprising a third length and configured to indicate a clock signal of the NVMe storage device; and
a fourth pin comprising a fourth length and configured to indicate a PCIe port signal of the NVMe storage device,
wherein the first length, the second length, the third length, and the fourth length meet one or more preset conditions to enable the connector to provide a PCIe communications interface that connects the NVMe storage device and the computer device, wherein the one or more preset conditions include the first length is less than the second length, the first length is equal to or less than the third length, and the first length is equal to or less than the fourth length, wherein the connector further comprises a first face and a second face, a limiting structure is arranged on the first face, the limiting structure is a boss or a groove, and the first pin is located in the middle of the first face.

13. The computer device of claim 12, further comprising athe boss, wherein the boss is the limiting structure of the connector, and wherein the connector is a male connector.

14. The computer device of claim 13, wherein the first length is 4.55 millimeters (mm) ± 0.08 mm.

15. The computer device of claim 12, further comprising:
the groove that is the limiting structure of the connector; and
a slot comprising a side edge,
wherein the connector is a female connector, and
wherein a distance between the first pin and the side edge is 1.90 millimeters (mm) 0.15 mm.

16. The computer device of claim 12, further comprising:
the first face comprising a first end and a second end;
a first edge pin located at the first end; and
a second edge pin located at the second end,
wherein a first distance between the first pin and the first edge pin is 17.87 millimeters (mm), and
wherein a second distance between the first pin and the second edge pin is 13.97 mm.

17. The connector of claim 1, wherein the in-service signal is to trigger a process of forcible hot swapping of the NVMe storage device.

* * * * *